(12) United States Patent
Weiss et al.

(10) Patent No.: US 8,189,726 B2
(45) Date of Patent: May 29, 2012

(54) METHODS AND APPARATUS FOR OPERATING A DIGITAL COMMUNICATIONS INTERFACE

(75) Inventors: Franz Weiss, Munich (DE); Daniel Kehrer, Munich (DE)

(73) Assignee: Qimonda AG, Munich (DE)

( * ) Notice: Subject to any disclaimer, the term of this patent is extended or adjusted under 35 U.S.C. 154(b) by 1120 days.

(21) Appl. No.: 12/042,599

(22) Filed: Mar. 5, 2008

(65) Prior Publication Data
US 2009/0225919 A1 Sep. 10, 2009

(51) Int. Cl.
*H04L 7/00* (2006.01)
*H04L 12/26* (2006.01)
*G01R 31/28* (2006.01)

(52) U.S. Cl. .................. 375/371; 370/249; 714/744
(58) Field of Classification Search .................. 375/232; 370/249
See application file for complete search history.

(56) References Cited

U.S. PATENT DOCUMENTS

| | | | | |
|---|---|---|---|---|
| 5,909,384 A * | 6/1999 | Tal et al. | ........... | 708/322 |
| 6,114,879 A * | 9/2000 | Popplewell et al. | ........... | 327/3 |
| 6,356,129 B1 * | 3/2002 | O'Brien et al. | ........... | 327/175 |
| 2004/0123208 A1 * | 6/2004 | Miller et al. | ........... | 714/744 |
| 2005/0025228 A1 * | 2/2005 | Stonick et al. | ........... | 375/232 |
| 2008/0192640 A1 * | 8/2008 | Simpson | ........... | 370/249 |
| 2009/0060021 A1 * | 3/2009 | Bulzacchelli | ........... | 375/233 |

OTHER PUBLICATIONS

Markus Groezing, Bernd Philipp, Matthias Neher and Manfred Berroth, Sampling Receive Equalizer with Bit-Rate Flexible Operation up to 10 Gbit/s, Proceedings of the 32nd European Solid-State Circuits Conference, 2006 (ESSCIRC 2006), Sep. 2006 pp. 516-519.
Jae-Yoon Sim, Young-Soo Sohn, Hong-June Park, Chang-Hyun Kim and Soo-In Cho, 840 Mb/s CMOS Demultiplexed Equalizing Transceiver for DRAM-to-Processer Communication, 1999 Symposium on VLSI Circuits, Digest of Technical Papers, 1999, pp. 23-24.

* cited by examiner

*Primary Examiner* — David C. Payne
*Assistant Examiner* — Sarah Hassan
(74) *Attorney, Agent, or Firm* — Patterson & Sheridan, LLP

(57) ABSTRACT

Embodiments of the invention relate to integrated circuits comprising inputs for receiving an input signal and a plurality of clock signals having a predetermined phase relationship. The integrated circuit may include a plurality of track-and-hold devices and a plurality of slicer devices. Signal outputs of two track-and-hold devices may be coupled to signal inputs of one slicer device, one of the two track-and-hold devices and the slicer device being coupled to a first input configured to receive a first clock signal and the other track-and-hold device being coupled to a second input being configured to receive a second clock signal.

23 Claims, 5 Drawing Sheets

METHODS AND APPARATUS FOR OPERATING A DIGITAL COMMUNICATIONS INTERFACE

BACKGROUND OF THE INVENTION

Transmission of signals over a conductive line from one device to another may generally result in a degradation of the signal. For example, the signal may become attenuated due to a variety of factors including noise, electromagnetic effects of the transmission line, and the like. Signal degradation may be especially problematic in the transmission of digital signals, wherein an ability to distinguish between discreet values of the signals is necessary for an accurate transmission.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
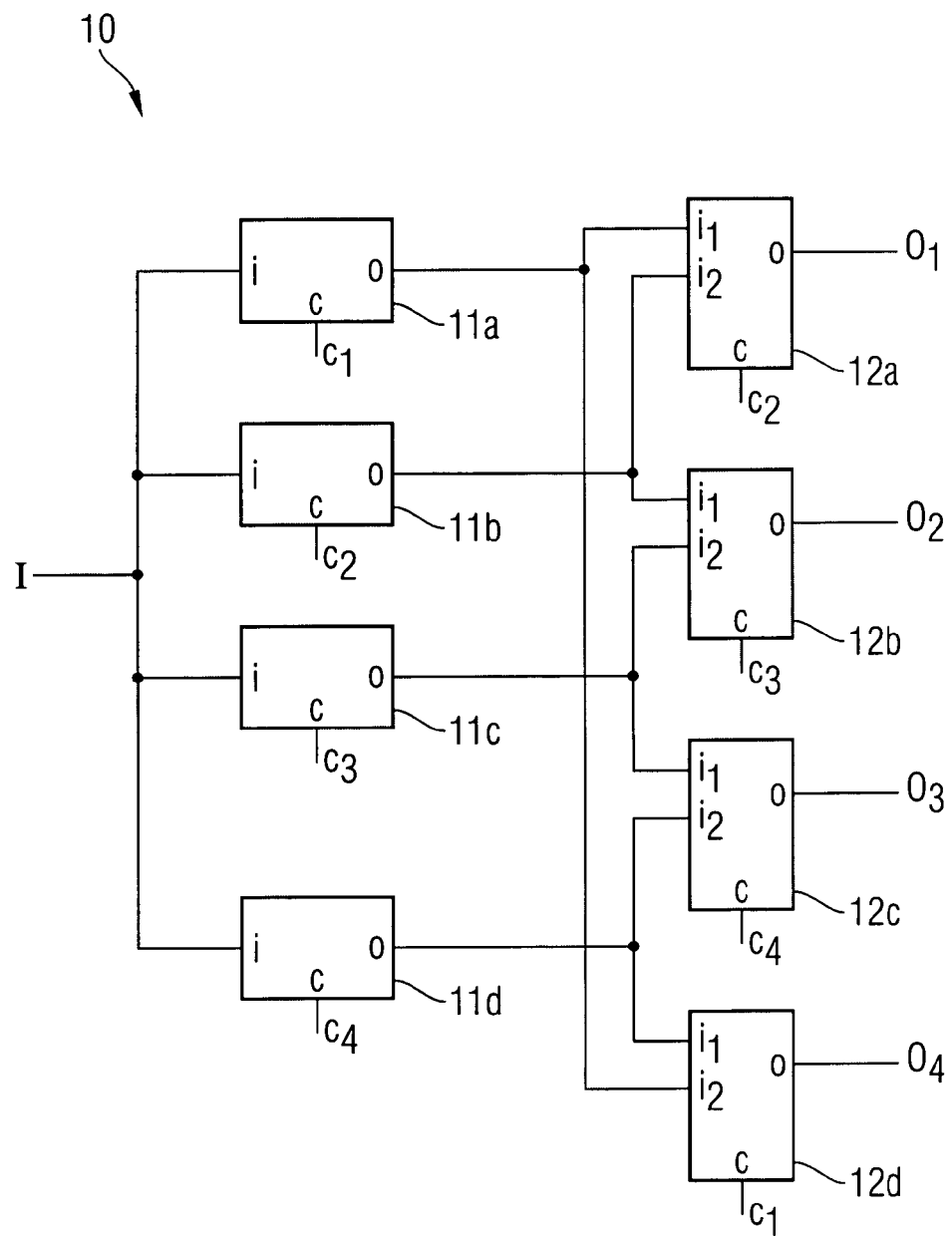
FIG. 1 illustrates a schematic diagram of an exemplary integrated circuit according to one embodiment of the invention.

Embodiments of the invention relate to an integrated circuit comprising at least one feed-forward equalization filter. Said filter is intended to receive an input signal which may be affected by signal degeneration and to adapt the signal for further usage in electronic circuits. Such a feed-forward equalization filter may be used at a digital communication interface such as an interface between a chip and a printed circuit board or an interface between an antenna and a chip or at the receiver section of a cable connection. It may also be used in optical communication systems as well.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given memory device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any memory device.

Embodiments of the invention may generally be used with any type of memory. In one embodiment, the memory may be a circuit included on a device with other types of circuits. For example, the memory may be integrated into a processor device, memory controller device, or other type of integrated circuit device. Devices into which the memory is integrated may include system-on-a-chip (SOC) devices. In another embodiment, the memory may be provided as a memory device which is used with a separate memory controller device or processor device.

In both situations, where the memory is integrated into a device with other circuits and where the memory is provided as a separate device, the memory may be used as part of a larger computer system. The computer system may include a motherboard, central processor, memory controller, the memory, a hard drive, graphics processor, peripherals, and any other devices which may be found in a computer system. The computer system may be part of a personal computer, a server computer, or a smaller system such as an embedded system, personal digital assistant (PDA), or mobile phone.

In some cases, a device including the memory may be packaged together with other devices. Such packages may include any other types of devices, including other devices with the same type of memory, other devices with different types of memory, and/or other devices including processors and/or memory controllers. Also, in some cases, the memory may be included in a device mounted on a memory module. The memory module may include other devices including memories, a buffer chip device, and/or a controller chip device. The memory module may also be included in a larger system such as the systems described above.

In some cases, embodiments of the invention may be used with multiple types of memory or with a memory which is included on a device with multiple other types of memory. The memory types may include volatile memory and non-volatile memory. Volatile memories may include static random access memory (SRAM), pseudo-static random access memory (PSRAM), and dynamic random access memory (DRAM). DRAM types may include single data rate (SDR) DRAM, double data rate (DDR) DRAM, low power (LP) DDR DRAM, and any other types of DRAM. Nonvolatile memory types may include magnetic RAM (MRAM), flash memory, resistive RAM (RRAM), ferroelectric RAM (Fe-RAM), phase-change RAM (PRAM), electrically erasable programmable read-only memory (EEPROM), laser programmable fuses, electrically programmable fuses (e-fuses), and any other types of nonvolatile memory.

FIG. 1 illustrates a schematic diagram of an exemplary receiver 10 according to an embodiment of the invention. The receiver 10 may be configured to receive a digital communication signal I, as illustrated in FIG. 1. In one embodiment, the receiver circuit 10 may be used to receive a digital signal from an optical communication interface or a cable carrying the digital signal I. In another embodiment, the receiver may be used to receive a signal transmitted on a printed circuit board. The receiver may be configured to reshape the received digital signal, e.g. by eliminating broadening of symbols or subtracting echoes or the like. The reshaped signal may be delivered to different digital electronics such as, for example, microprocessors, microcontrollers, memory modules, amplifiers or the like by means of a printed circuit board.

In one embodiment, the receiver 10 may be built on its own semiconductor die to form a single device on a printed circuit board. In another embodiment, the receiver illustrated in FIG. 1 may be part of an electronic device such as, for example, a microcontroller, a microprocessor, an amplifier, a memory module or the like. Accordingly, the receiver 10 may be built on its own semiconductor die and integrated in the same package as the electronic device. In still another embodiment, the receiver may be integrated on the same semiconductor die as the electronic device.

As illustrated in FIG. 1, the receiver 10 may include four track-and-hold devices 11a, 11b, 11c and 11d. Each of said track-and-hold devices 11 may include a signal input i, a signal output o and a clock input c. In one embodiment, the input i of each track-and-hold device 11 may be connected to the same input signal I. The input signal may originate from a cable connection, an optical receiver or from any other device located on the same printed board as the receiver 10.

Furthermore, four clock signals $C_1$, $C_2$, $C_3$ and $C_4$ are provided to the track and hold devices, as illustrates in FIG. 1. The four clock signals may be configured to define a clock rate at which each subsystem 11a, 11b, 11c, 11d, 12a, 12b, 12c and 12d of the receiver 10 operates. Each of the clock signals $C_1$, $C_2$, $C_3$ and $C_4$ may comprise a phase shift in order to let every subsystem operate at a different yet synchronized point in time.

In one embodiment, a single track-and-hold device 11 may be configured to generate an output value which corresponds exactly to the input value I. In another embodiment, the output value of a track-and-hold device 11 may be increased by a constant factor compared to the input value I. In still another embodiment, the output value may be increased or decreased by adding or subtracting a constant voltage level from the input signal I.

In any case, the output o of the track-and-hold device 11 may follow the input value i as long as the device is not triggered by means of the input value at the clock input c. When the input signal at clock input c changes its state, the output value at or near that point in time may be fixed. Either after a predetermined span of time or after another change of the input signal on the clock signal line c the output may be released and may therefore follow the input signal I again.

According to the embodiment illustrated in FIG. 1, two of the clock signals $C_1$, $C_2$, $C_3$ and $C_4$ may have a predefined phase shift relative to one another. For example, clocks $C_1$ and $C_2$ may have a predetermined phase relationship. Therefore, outputs of two track-and-hold devices associated with the two clock signals triggered by clock signals $C_1$ and $C_2$, e.g. 11a and 11b, may represent the input signal at two different points in time.

In one embodiment the output signals of two track-and-hold devices, for example, track and hold devices 11a and 11b may be delivered to one slicer device 12. According to the embodiment illustrated in FIG. 1, four slicer devices 12a, 12b, 12c and 12d are provided. Each slicer device 12 may include two signal inputs $i_1$ and $i_2$, a clock input c and an output o. Each of said slicer devices 12 may be configured to generate an output value $O_1$, $O_2$, $O_3$ and $O_4$ based on two input values $i_1$ and $i_2$ at a point in time which is given by a rising or falling edge of a clock signal C. The input values $i_1$ and $i_2$ for each slicer device 12 may be provided by two track-and-hold devices which may be configured to be driven by two clock signals having a predetermined phase relationship. As an example, the slicer device 12a may generate an output value $O_1$ based on the output of track-and-hold device 11a and 11b. Slicer device 12b may generate an output value $O_2$ based on the output of track-and-hold device 11b and 11c. Slicer device 12c may generate an output value $O_3$ based on the output values of track-and-hold device 11c and 11d, and slicer device 12d may generate an output value $O_4$ based on input values provided by track-and-hold devices 11d and 11a.

Slicer devices 12 may be configured to restore the original shape and amplitude of the input signal. For example, broadening of symbols, echoes or superposition of symbols on the input signal I may be removed from the output signals $O_1$, $O_2$, $O_3$ and $O_4$ by comparing two subsequent samples of the input signal I. Said comparison may be done after two samples of the input signal I have been provided to two slicer devices which have been triggered by two clock signals with a predefined delay. Each slicer device may be triggered by means of the later of said two clock signals. For example, slicer device 12a may receive input from the track and hold devices 11a and 11b, which are driven by the clock signals C1 and C2 respectively. Clock signal C2 may be delayed in phase in comparison to clock C1. Accordingly, the slicer 12a is driven by the clock signal C2. Furthermore, a serial data stream delivered to the receiver by means of input signal I is converted to a parallel data stream on data lines $O_1$, $O_2$, $O_3$ and $O_4$.

Figure 2:
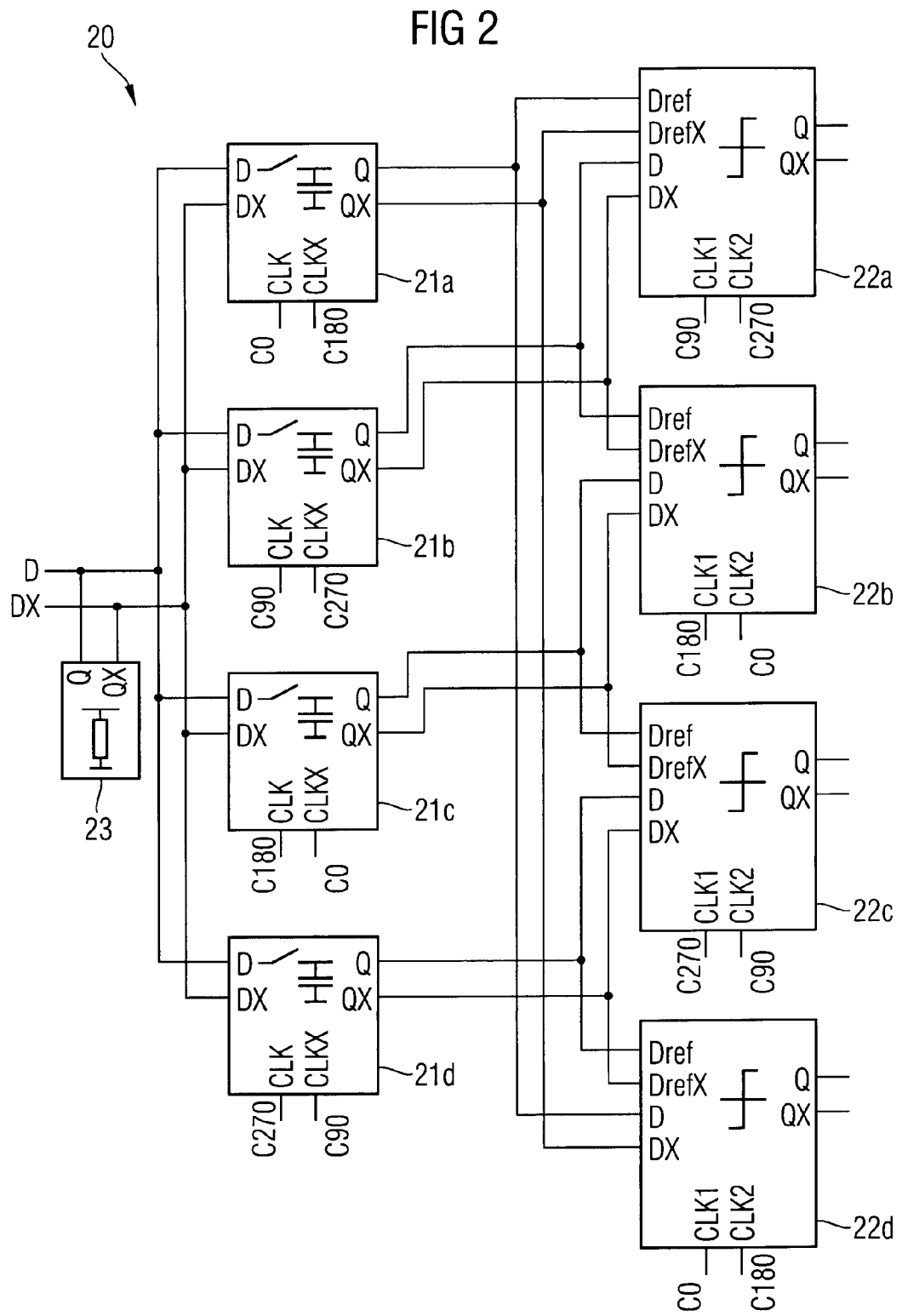
FIG. 2 illustrates a schematic diagram of another exemplary integrated circuit according to an embodiment of the invention.

FIG. 2 illustrates another device 20 according to an embodiment of the invention. As illustrated in FIG. 2, the device 20 may operate on differential input, clock and output signals. Such a differential signal consists of an input signal D and its inverted signal DX. The inverted signal DX may be used to eliminate any noise or signal artifacts that are not present on both lines identically.

Additionally, as illustrated in FIG. 2, every clock signal CLK may be accompanied by its inverted clock signal CLKX. Receivers 21a-21d illustrated in FIG. 2 may operate on a pair of clock signals, each clock signal in the pair of clock signals having a phase angle of either 0°, 90°, 180° and 270°. Accordingly, four clock signals may be provided to the device 20, each of the four clock signals having a phase of either 0°, 90°, 180° or 270°. In one embodiment, each pair of clock signals provided to a receiver 21 may have a phase relation of 180°, thereby providing a differential clock signal to the receiver. For example, the clock signals with 0° and 180° phase may form a first pair of differential clock signals, the clock signals with 90° and 270° phase may form the second pair of differential clock signals, the clock signals with 180° and 0° phase may form the third pair of differential clock signals, and the clock signals with 270° and 90° phase may form the fourth pair of differential clock signals. Therefore, no additional clock signals are needed to provide differential clock signals for any part of the receiver 20 detailed in FIG. 2. In another embodiment, dedicated inverted signals may be provided, thereby doubling the number of clock signals involved to 8 clock signals.

In one embodiment, any of the track-and-hold devices 21a, 21b, 21c and 21d may be configured to generate an output value Q and QX with the same amplitude as the input values D and DX, respectively. In another embodiment, the amplitude of the output values Q and QX of any of said track-and-hold devices 21a, 21b, 21c and 21d may be increased or decreased by a constant factor compared to the input values D and DX. In still another embodiment, the output values may be increased or decreased by adding or subtracting a constant voltage level from the input signals D and DX.

In any case, the outputs Q, QX of the track-and-hold device 21 may follow the input values D and DX as long as the device is not triggered by means of the input value at the clock inputs CLK and CLKX. When the input signals clock inputs CLK and CLKX change their state, the output value at or near that point in time may be fixed. Either after a predetermined span of time or after another change of the input signals on the clock signal lines CLK and CLKX the outputs Q and QX may be released and follow the input signals D and DX again.

In one embodiment, sets of clock signals provided to two track and hold devices may have a predetermined phase shift relative to each other. Therefore, the outputs of the two track-and-hold devices 21 triggered by different sets of clock signals, such as 21a and 21b, 21b and 21c, 21c and 21d, 21d and 21a may represent the input signal at two different points in time. Each pair of track-and-hold devices 21a and 21b, 21b and 21c, 21c and 21d, 21d and 21a is hereinafter referred to as subsequent track-and-hold devices.

The output signals Q and QX of two subsequent track-and-hold devices 21a and 21b, 21b and 21c, 21c and 21d, 21d and 21a may be delivered to one of slicer devices 22a, 22b, 22c and 22d. Each slicer device 22a, 22b, 22c and 22d may include four signal inputs Dref, DrefX, D and DX, two clock inputs CLK1 and CLK2 and two outputs Q and QX, enabling the slicer device 22 to handle each signal described with respect to the embodiment in FIG. 1 as a differential signal.

In one embodiment each of the slicer devices 22a, 22b, 22c and 22d may be configured to generate two output values Q and QX from its four input values Dref, DrefX, D and DX at a point in time which may be given by a rising and a falling edge of two clock signals CLK and CLKX. The input values Dref, DrefX, D and DX of the slicer device 22a, 22b, 22c and 22d may be provided by two subsequent track-and-hold devices 21a and 21b, 21b and 21c, 21c and 21d, 21d and 21a. As an example, the slicer device 22a may generate an output value Q and Qx based on the outputs of track-and-hold device 21a and 21b. Slicer device 22b may generate an output value Q and Qx based on the outputs of track-and-hold device 21b and 21c. Slicer device 22c may generate an output value Q and Qx based on the output values of track-and-hold device 21c and 21d, and slicer device 22d may be configured to generate an output value Q and Qx based on output values provided by track-and-hold devices 21d and 21a.

Slicer devices 22a, 22b, 22c and 22d may be configured to restore the original shape and amplitude of the input signal. Broadening of symbols, echoes or superposition of symbols on the input signals D and DX of the track-and-hold devices 21 may be removed from the output signals of the slicer devices 22a, 22b, 22c and 22d by comparing two subsequent samples of the input signals D, DX, DrefX and Dref. Furthermore, a serial data stream delivered to the receiver 20 by means of input signal D and DX may be converted to a parallel data stream on 4 output data lines Q, QX of slicer devices 22a, 22b, 22c and 22d.

In one embodiment, a resistor network 23 may be added to the receiver to allow for impedance matching of the signal lines delivering the input signals to the track-and-hold devices 21. This resistor network is optional and may be omitted in other embodiments of the invention.

Figure 3:
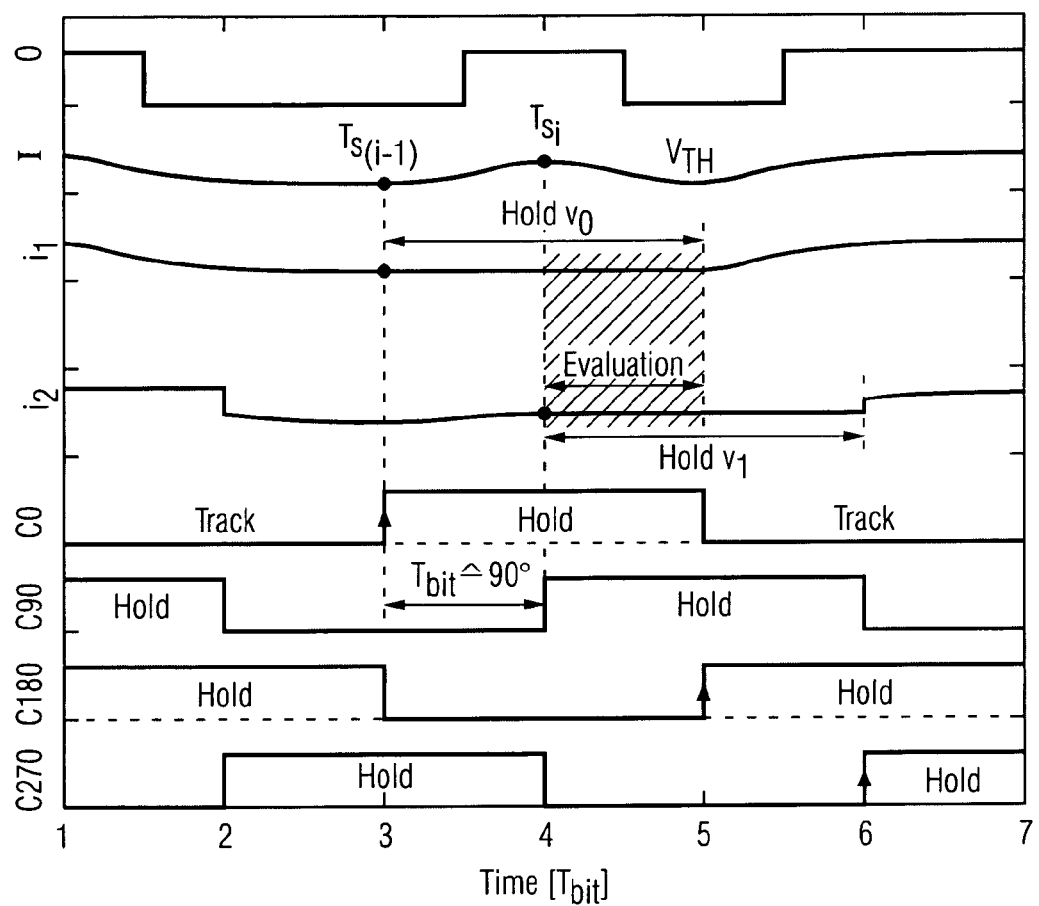
FIG. 3 illustrates an exemplary timing diagram of signals associated with the integrated circuits of FIGS. 1 and 2, according to an embodiment of the invention.

FIG. 3 illustrates some of the signals which may be measured on the integrated circuit according to any one of FIGS. 1 and 2. The horizontal axis depicts the time in discrete steps $T_{bit}$ which are defined by a leading and falling edge of one clock signal out of a set of four clock signals.

Exemplary clock signals are illustrates in lines 5 to 8 of FIG. 3. Each clock signal may consist of a square wave signal with a period of four time steps $T_{bit}$. The first clock signal is defined without a phase shift and is therefore referenced as C0. The clock signal C90 has a phase shift of 90° compared to the clock signal C0. Therefore, a subsystem of the receiver synchronized with C90 operates one time step later than a subsystem synchronized to C0. The clock signal C180 has a phase shift of 180° compared to C0 and a phase shift of 90° to C90. Therefore, a subsystem of the receiver synchronized to C180 operates two steps after a subsystem synchronized to C0 and one step after a subsystem synchronized to C90. Furthermore, such a device will operate one step earlier than a subsystem synchronized to C270.

Line 2 in FIG. 3 represents the input signal I or D which is delivered to the respective inputs of four track-and-hold devices 11a, 11b, 11c and 11d or 21a, 21b, 21c and 21d respectively. The input signal suffers from signal degeneration due to reflections and/or internal losses of a cable, a micro strip line or the like. Therefore, digital symbols separated by leading and falling edges are not very distinct on the input signal. The receiver 10 or 20 is intended to reconstruct the input signal I to the original signal O which is given in line 1 of FIG. 3.

Therefore, the input signal I is delivered to the input of track-and-hold device 11a or 21a. The output of this track-and-hold device is referred to as $i_1$ and is shown in line 3 of FIG. 3. Furthermore, the input signal I is delivered to the input of track-and-hold device 11b or 21b. The output of track-and-hold device 11b is referenced as $i_2$ and shown in line four of FIG. 3.

The track-and-hold devices are configured to generate an output value which corresponds to the input signal I. At a predetermined point in time, which is given by the rising edge of the clock signal delivered to the respective track-and-hold device, the output value is fixed to the input value given at that very point in time. Looking at the example in FIG. 3 the clock signal C0 delivered to track-and-hold device 11a shows a rising edge at time bit 3 indicating a point in time $T_{s(i-1)}$. Therefore, signal $i_1$ does not change anymore for two time bits until point in time $T_{s(i+1)}$. The input value $i_1$ at point in time $T_{s(i-1)}$ is stored and provided to the slicer device 12a for evaluation.

At point in time $T_{s(i)}$ a rising edge of clock signal C90 occurs. As this clock signal is connected to track-and-hold device 11b, the output signal $i_2$ of track-and-hold device 11b may be fixed until point in time $T_{s(i+2)}$. For a period of one time bit between point in time $T_{s(i)}$ and $T_{s(i+1)}$, both track-and-hold devices 11a and 11b have a fixed output value. During this period, these values can be evaluated by the slicer device 12a. Therefore, slicer device 12a is also connected to the clock signal C90 in order to use this single time bit for generating an output value $O_1$.

At point in time $T_{s(i+2)}$ the third clock signal C180 shows a rising edge. This rising edge is used for fixing the output value from track-and-hold device 11c, which is not shown in FIG. 3. The output value from track-and-hold device 11c can be compared for one clock cycle with the output value of track-and-hold device 11b by means of slicer device 12b which is triggered by C180 also. At point in time $T_{s(i+2)}$ a falling edge of clock signal C0 has occurred also which triggers the output of track-and-hold device 11a to follow its respective input signal I again.

In the described manner, all four track-and-hold devices 11a, 11b, 11c and 11d and all four slicer devices 12a, 12b, 12c and 12d are sequentially activated in order to generate bit by bit an output signal by comparing one sampled input value with its immediately preceding sampled input value.

According to other embodiments of the invention, the clock rate may be given by a different set of clock signals. As an example, two clock signals with a phase shift of 90° may be used when every functional unit 11a, 11b, 11c, 11d, 12a, 12b, 12c and 12d operates on every leading and trailing edge. In still another embodiment, four clock signals may be used with a phase shift of 45° and half frequency compared to the clock signals detailed in FIG. 3 when any functional unit operates on every leading and falling edge of its respective clock signal.

Figure 4:
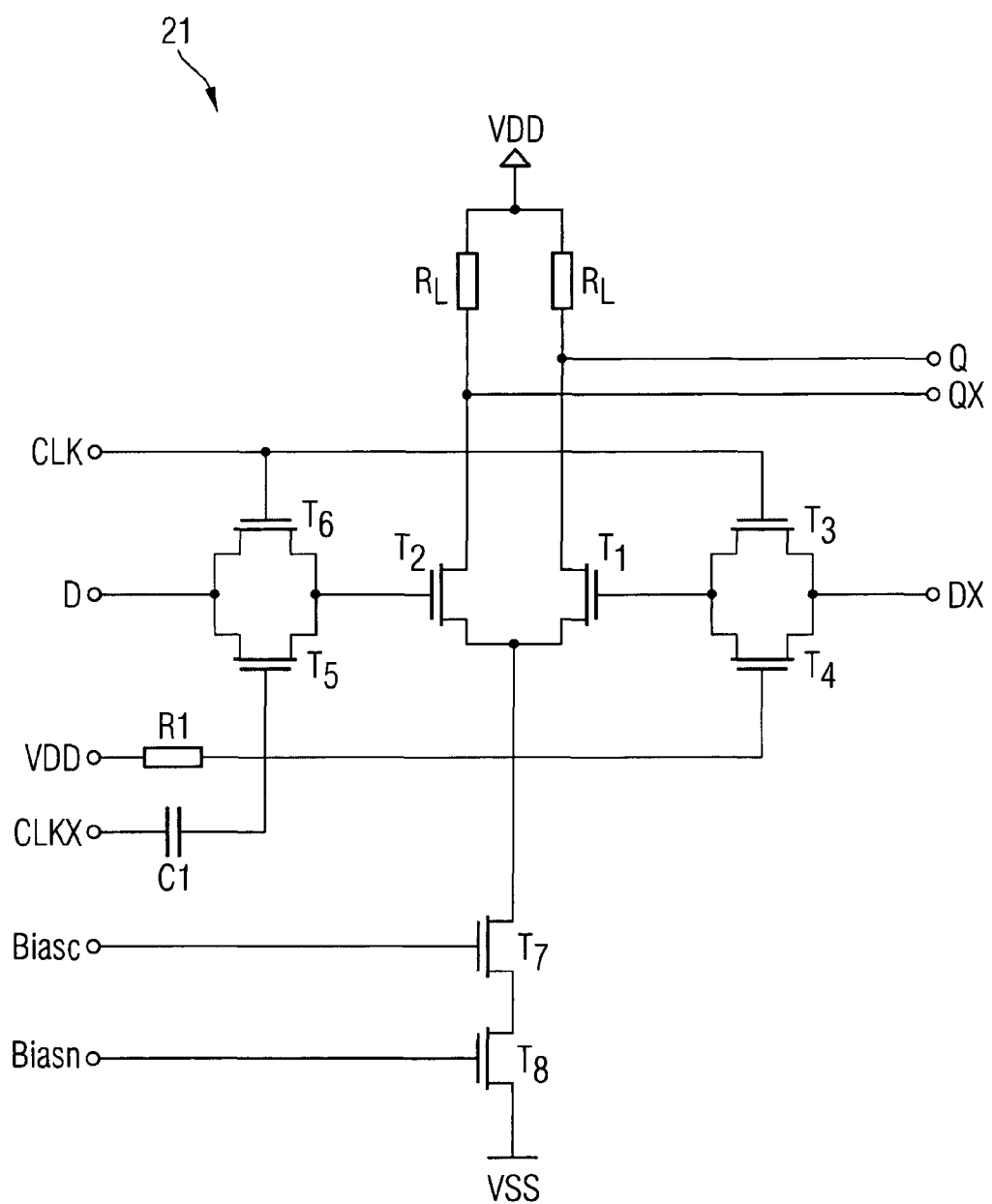
FIG. 4 illustrates an exemplary track-and-hold device according to an embodiment of the invention.

FIG. 4 an exemplary track-and-hold device 21 according to an embodiment of the invention. The track-and-hold device 21 may include two field effect transistors $T_1$ and $T_2$ in order to generate an output signal QX and Q by means of any input signal D and DX. The input signal D may be coupled to the gate of the field effect transistor $T_2$. Therefore, the electrical resistance of transistor $T_2$ may vary depending on the voltage level of the input signal D. This may result in a variable current flowing from the upper potential VDD through the resistor $R_L$, transistor $T_2$, $T_7$ and $T_8$ to the lower potential VSS. The voltage drop at this changing electrical resistor may generate the inverted output signal QX.

As the embodiment according to FIG. 4 operates on differential input signals, the inverted input signal DX is coupled to the gate of the field effect transistor $T_1$. Therefore, the electrical resistance between source and drain of $T_1$ may also vary depending on the voltage level of the input signal DX, thereby modulating the current flowing from the upper potential VDD through the resistor $R_L$, transistor $T_1$, $T_7$ and $T_8$ to the lower potential VSS. The variable current may result in a variable voltage drop at resistor $R_L$ representing the output signal Q.

By delivering a gate voltage biasc or biasn to the field effect transistors $T_7$ and $T_8$, a common voltage drop may be added to the outputs Q and QX. This voltage drop is used to add a constant bias voltage to the output signals. Nevertheless, the output will still follow the input signal D and DX. It should be noted, that the adjustable bias voltage implemented by transistors $T_7$ and $T_8$ is optional and may be omitted in other embodiments. In still another embodiment, a fixed resistor value may be used instead of transistors $T_7$ and $T_8$ resulting in a fixed bias voltage.

If a predetermined point in time has come to fix the output values Q and QX, the input voltages D and DX may be separated from the respective gates of transistors $T_1$ and $T_2$. This may be done by transistors $T_3$, $T_4$, $T_5$ and $T_6$. The gate electrodes of these transistors may be coupled with the clock signal CLK and the inverted clock signal CLKX. Depending on the gate voltage, the resistance between source and drain of each transistor $T_3$, $T_4$, $T_5$ and $T_6$ may be either high or low. Therefore, transistor $T_3$, $T_4$, $T_5$ and $T_6$ may be operating as a switch which may be able to connect or disconnect the input signals D and DX from the gate electrode of transistor $T_1$ and $T_2$.

If the input signals D and DX are not connected to their respective gate electrodes, $T_1$ and $T_2$ store the last voltage level in their respective gate capacity. This may lead to the resistance between source and drain of $T_1$ and $T_2$ to remain at their last values. As the resistance of $T_1$ and $T_2$ is constant, the current flowing from the upper potential VDD through the resistor $R_L$, transistor $T_1$, $T_7$ and $T_8$ to the lower potential VSS may also be constant. The constant current may result in a constant voltage drop at resistors $R_L$ representing the output signals Q and QX.

When the clock signals CLK and CLKX change their state to low resistance again, the input signals D and DX may be coupled to the gate of transistor $T_1$ and $T_2$ again. This may lead to the resistance between source and drain of $T_1$ and $T_2$ to change with input voltage level. As the resistance of $T_1$ and $T_2$ is changing, the current flowing from the upper potential VDD through the resistor $R_L$, transistor $T_1$, $T_7$ and $T_8$ to the lower potential VSS may also vary. The variable current results in a variable voltage drop at resistors $R_L$ representing the output signals Q and QX.

It has to be noted that the track-and-hold device 21 detailed in FIG. 4 may be changed to operate on a single ended input signal. Such a modification may lead to a track-and-hold device 11 as used in the embodiment explained with respect to FIG. 1.

Figure 5:
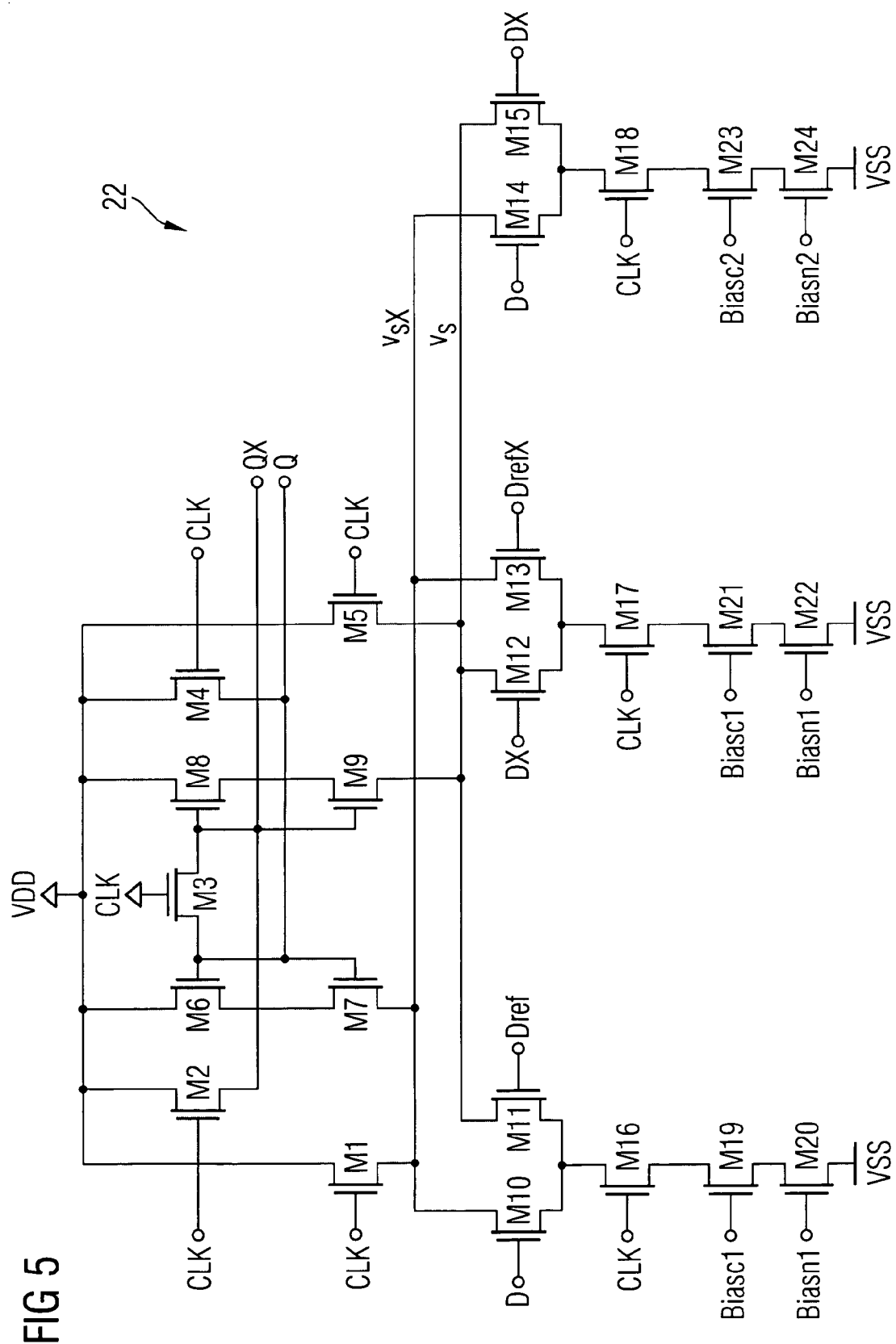
FIG. 5 illustrates an exemplary slicer device according to an embodiment of the invention.

FIG. 5 illustrates an exemplary slicer device 22 according to an embodiment of the invention. The core of the slicer device 22 illustrated in FIG. 5 may include a sense amplifier which is configured to amplify the charge difference between two voltage levels. The upper part of the drawing consisting of transistors M1, M2, M3, M4, M5, M6, M7, M8 and M9 may be configured to couple the output inputs Q and QX to the supply voltage VDD on a predetermined voltage level of the clock signal CLK only. Therefore, slicer device 22 will not generate an output signal Q and QX if not triggered by a clock signal CLK. It has to be noted, that the slicer device may operate either on a high voltage level or a low voltage level of the clock signal CLK depending on the type of transistors used.

In the lower part of the drawing, the output signals Q and QX are generated depending on three differential values. The embodiment illustrated in FIG. 5 uses a first differential value generated from the input value D obtained from a first track-and-hold device at a first point in time and an input value Dref generated from a second track-and-hold device at a second point in time. Furthermore, a second differential value is generated from the inverted input signals DX and DrefX. A third differential value is generated by comparing the input value D and DX generated from said first track-and-hold device at said first point in time. Any inequality between any pair of input values D/DX, DX/DrefX and D/Dref may result in a different potential on the line Vs and VsX. This different voltage level between the line Vs and VsX is amplified by transistors M1 to M9 and represents the output values Q and QX. Therefore, the output value Q and QX is built as a sum of all three differential values D/DX, DX/DrefX and D/Dref.

With optional circuitry comprising transistors M16, M17, M18, M19, M20, M21, M22, M23 and M24, a constant bias can be added to any differential value D/DX, DX/DrefX and D/Dref. By this measure, the output signal may include a sum of products, each product being determined from a factor of proportionality represented by the bias voltage and a difference of two input signals selected from D, Dref, DX and DrefX.

It has to be noted that the bias value generation realized by means of transistors M16, M17, M18, M19, M20, M21, M22, M23 and M24 and input values Biasc1, Biasn1, Biasc2 and Biasn2 may be omitted or may be replaced by resistors, which will result in fixed values for the factor of proportionality.

Furthermore, it has to be noted, that those skilled in the art may add additional differential values in order to increase the performance of the slicer device 22. On the other hand, some of the differential signals detailed in the embodiment from FIG. 5 may be omitted. This may be especially useful to adapt the slicer device to single ended signals as detailed with respect to slicer device 12.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention. Embodiments of the invention have been described in the form of functional elements such as a slicer device 12 or 22 or a track-and-hold device 11 or 21. Those elements may be realized in different embodiments either in hardware or by use of a software intended to be run on a microprocessor or a microcontroller. Embodiments of the invention do not rely on the strict realization of a certain embodiment. The interconnects between the functional elements may be realized as wired connection made of a conductive material such a printed circuit board or of a bond wire. The interconnects may couple to functional elements described herein directly or may comprise further functional elements.

What is claimed is:

1. An integrated circuit, comprising:
   at least two track-and-hold devices, each comprising at least one signal input, at least one signal output, and at least one clock input; and
   at least one slicer device comprising at least two signal inputs, at least one signal output, and at least one clock input,
      wherein signal outputs of a first and second track-and-hold device of the at least two track-and-hold devices are coupled to respective signal inputs of the at least one slicer device, and
      wherein the first track-and-hold device and the first slicer device receive a first clock input to receive a first clock signal, and the second track-and-hold device receives a second clock signal, the first and second clock signals being correlated to each other with a predetermined phase.

2. The integrated circuit according to claim 1, wherein said slicer device comprises a sense-amplifier.

3. The integrated circuit according to claim 1, wherein said slicer device is configured to generate an output signal proportional to a difference of the output signals of said first and second track-and-hold devices.

4. The integrated circuit according to claim 1, wherein said track-and-hold devices comprise a current source configured to adjust output signals of said track-and-hold devices by a predetermined factor.

5. The integrated circuit according to claim 1, wherein said slicer device is configured to generate an output signal comprising a sum of products, each product being determined by a first predefined value and a difference of the least two input signals.

6. The integrated circuit according to claim 1, wherein any of said signal inputs or said signal outputs are configured to receive and/or send differential signals.

7. The integrated circuit according to claim 1, wherein said any one of the at least two track-and-hold devices comprises a first switch for coupling and decoupling the at least one signal input from a second switch, said first switch being controlled by one of said first and second clock signals and said second switch being controlled by the at least one signal input and being configured to couple and decouple a voltage source to the at least one signal output said track-and-hold device.

8. The integrated circuit according to claim 7, wherein any of said first switch or said second switch comprises a field effect transistor.

9. The integrated circuit according to claim 8, wherein the gate capacity of said second switch is configured to store a voltage level from said input signal.

10. The integrated circuit according to claim 1, said slicer devices and said track-and-hold devices are integrated on a single silicon die.

11. A method for receiving a digital signal, comprising:
    providing at least one input signal to at least two track-and-hold devices;
    coupling signal outputs of a first and second track-and-hold device of the at least two track-and-hold devices to respective signal inputs of at least one slicer device;
    providing a first clock signal of at least two clock signals to the first track-and-hold device and the slicer device;
    providing a second clock signal of the at least two clock signals to the second track-and-hold device, the first and second clock signals being correlated to each other with a predetermined phase; and
    generating a signal representing at least a portion of the received digital signal at an output of said at least one slicer device.

12. The method according to claim 11, wherein the output signal is proportional to a difference of at least two input signals received by the at least one slicer device.

13. The method according to claim 11, wherein the output signal comprises a sum of a predetermined value and a difference of the at least two input signals of the at least one slicer device.

14. The method according to claim 11, wherein any of said input signals, said output signal and said clock signal are provided as differential signals.

15. The method according to claim 11, wherein an input signal of said slicer device is generated by any one of the at least two track-and-hold devices by:
    providing a first field effect transistor of said track-and-hold device to either couple or decouple a voltage source to at least one signal output of said track-and-hold device;
    controlling the first field effect transistor using the at least one input signal; and
    breaking a connection of said at least one input signal to the first field effect transistor using a second field effect transistor, said second field effect transistor being controlled by one of the at least two clock signals.

16. An integrated circuit, comprising:
    at least one first input configured to receive at least one input signal and at least a first clock input and a second clock input configured to receive a first clock signal and a second clock signal respectively, the first and second clock signals being correlated to each other with a predetermined phase;
    at most four track-and-hold devices, each comprising at least one signal input, at least one signal output, and at least one clock input; and
    at most four slicer devices, each comprising at least two signal inputs, at least one signal output, and at least one clock input,
       wherein signal outputs of a first and second track-and-hold device are coupled to respective signal inputs of a first slicer device,
       wherein the first track-and-hold device and the first slicer device are coupled to the first clock input to receive the first clock signal, and the second track-and-hold device is coupled to the second clock input to receive the second clock signal, and
       wherein said slicer devices comprise a sense-amplifier.

17. The integrated circuit according to claim 16, wherein said slicer devices are configured to generate an output signal proportional to a difference of the output signals of said first and second track-and-hold devices.

18. The integrated circuit according to claim 16, wherein said track-and-hold devices comprise a current source configured to adjust output signals of said track-and-hold devices by a predetermined factor.

19. The integrated circuit according to claim 16, wherein said slicer device is configured to generate an output signal comprising a sum of products, each product being determined by a first predefined value and a difference of two input signals selected from a plurality of input signals.

20. The integrated circuit according to claim 16, wherein any of said signal inputs or said signal outputs are configured to receive and/or send differential signals.

21. A method for receiving a digital signal, comprising:
providing at least one input signal;
providing at least two clock signals being correlated to each other with a predetermined phase;
providing said at least one input signal to at most four track-and-hold devices;
coupling an output of a first and second track-and-hold device to respective signal inputs of one slicer device;
providing a first clock signal to the first track-and-hold device and the slicer device;
providing a second clock signal to the second track-and-hold device; and
generating a signal representing at least a portion of the received digital signal at an output of said slicer device, wherein the output signal is proportional to a difference of at least two input signals received by the slicer device.

22. The method according to claim 21, wherein the output signal comprises a sum of a predetermined value and a difference of two input signals selected from a plurality of input signals.

23. The method according to claim 21, wherein any of said input signals, said output signal and said clock signal are provided as differential signals.

* * * * *